Aug. 10, 1954     E. KLEIN     2,685,734
COMBINED MEAT CARVING KNIFE, BONE SAW, AND MEAT FORK
Filed March 14,
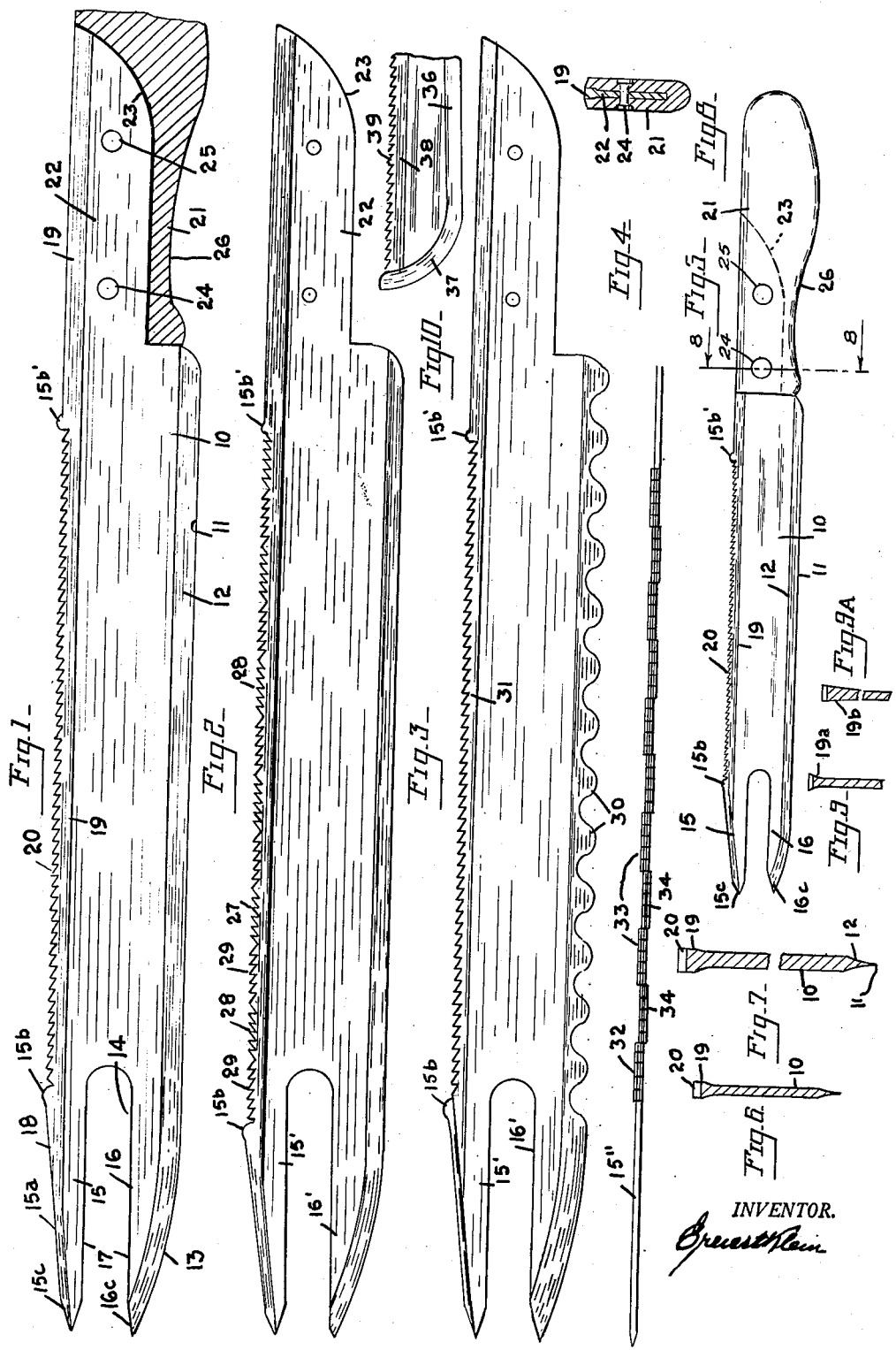
INVENTOR.
Ernest Klein Patented Aug. 10, 1954

2,685,734

UNITED STATES PATENT OFFICE 2,685,734

COMBINED MEAT CARVING KNIFE, BONE SAW, AND MEAT FORK

Ernest Klein, Brooklyn, N. Y.

Application March 14, 1952, Serial No. 276,581

2 Claims. (Cl. 30—144)

1

This invention relates to an improved meat cutting or carving knife, and one of its objects is to provide a carving knife with saw teeth on its upper edge which are capable of cutting through the bone of a ham or other body of meat, and to further provide the carving knife with fork tines at one end thereof, which are so constructed that meat will be compressed between the tines when they are forced through a slice of ham or other meat, so that the meat slice will not slip from the forked end of the carving knife and may be controlled while being dispensed to a serving plate or tray.

Another object of the invention is the provision of a meat carving knife with blade having a thickened upper longitudinal edge on which saw teeth are formed, so that setting of the teeth may be avoided and extremely hard high speed or chrome-nickel steel may be used in the manufacture of the blades, and rapid cutting made with the teeth.

A further object of the invention is to provide a meat carving knife with a hollow ground cutting edge on one longitudinal side of the blade and a factory rolled upper edge having honed saw cutting teeth with a forward work or stroke stop at one end of the row of teeth, and an end pick-up meat fork having a relatively large opening located between two fork tines, each one of which is formed with an outer cutting edge to facilitate the penetration of the meat by the fork, the blade having a handle and the upper thickened longitudinal edge of the blade being exposed even with the upper side of the handle, and terminating inwardly of the rear end of the handle.

With the above and other objects in view the invention relates to certain new and useful combinations, constructions and arrangements of parts, clearly described in the following specification, and fully illustrated in the drawings, in which:

Fig. 1 is a side view of a carving knife blade, illustrated in full scale, showing my invention.

Fig. 2 is a similar view of a modification showing a carving knife blade provided with saw teeth arranged in alternating grooves and bevelled in opposite directions, to cut on both strokes.

Fig. 3 is a similar view of another modification, showing a bread knife provided with a row of saw teeth on its upper edge.

Fig. 4 is a top edge view of still another modification, showing the saw edge of the knife provided with groups of teeth set in opposite direction.

2

Fig. 5 is a side view on a reduced scale of the form of the invention shown in Fig. 1, showing the handle of the knife.

Fig. 6 is a transverse sectional view through the knife blade, showing the rolled upper edge and the saw tooth construction thereof.

Fig. 7 is a similar view to Fig. 6, enlarged, and broken away for convenience of illustration.

Fig. 8 is a cross sectional view, taken on line 8—8 of Fig. 5, looking in the direction of the arrows.

Fig. 9 is a detail cross sectional view of a modified knife blade.

Fig. 9A is another similar view of another modified knife blade.

Fig. 10 is a fragmentary side elevation of a knife blade, having a hollow ground edge curved around the front end of the blade and saw teeth on the upper longitudinal edge thereof.

Referring to Figs. 1, 5, 6, 7 and 8, 10 designates the blade of a meat carving knife, formed with a longitudinal cutting edge 11, produced by side hollow grinding 12, and having a convex curved forward end portion 13.

The blade 10 is formed with a longitudinal meat receiving slot or opening 14, located approximately midway of the cutting edge 11 and the upper longitudinal edge of the blade, which divides the forward end of the blade into the fork tines 15 and 16. The inner side 17 of each of these tines is straight and the two sides disposed in the same plane and in parallel relation to each other. The hollow ground cutting edge 11 extends forwardly along the convex curved portion 13, thus providing the outer edge of the tine 16 with a meat cutting edge. The upper edge 18 of the tine 15 is slightly bevelled and is also provided with a cutting edge 15a, which terminates in a stop 15b.

The upper longitudinal edge of the blade is rolled at the steel mill to provide a thickened edge portion 19, which stiffens the blade and on which a row of bone cutting saw teeth 20 are formed. In Fig. 1 these teeth are shown with bevelled sides disposed rearwardly of the right angular cutting tips or portions of the teeth, so that the saw teeth will cut a bone in a forward moving stroke. These teeth extend in a straight line from the stop 15b to a point or stop 15b' near the handle 21.

The rear end of the blade 10 is reduced to provide a handle tang 22, the upper edge of which is formed with the thickened rolled edge 19, and the lower edge of which is parallel thereto. The upper longitudinal rolled edge 19 of the tang is disposed flush with the upper longitudinal edge of the handle 21. The lower edge of the tang curves at 23 upwardly and rearwardly and the handle 21 extends endwise thereof. The slot in the handle may be cut with a rotary circular saw having a cutting edge conforming to the curved end 23 of the tang 22. Headed rivets 24 and 25 extend through the handle 21 and the tang 22 to permanently unite the handle to the blade. This construction exposes the upper longitudinal and thickened edge of the blade to the hand of the user, and provides an unslotted longitudinal edge on the handle, which adds to the grip. The lower edge of the handle is provided with a molded curve 26 to fit the hand and provide for a strong grip.

The thickened rolled edge of the blade provides teeth which are wider than the body of the blade itself, so that offsetting of the teeth may be dispensed with, and this prevents destruction of the teeth, and also permits the use of stainless steel of extremely hard quality, so that long wearing and fast cutting saw teeth are provided.

In Fig. 2 there is shown a carving knife blade having a row of teeth 27, arranged in alternating groups. Every other group 28 is constructed to cut on the forward moving stroke, and every other group 29, arranged between the groups 28, is arranged to cut on the rearward moving stroke. The construction of the blade is otherwise as shown in Fig. 1.

In Fig. 3 there is shown a carving knife blade having a cutting edge formed with scalloped bread teeth or serrations 30 of any contour or shape, and a row of saw teeth 31 on the upper longitudinal edge thereof. These teeth 30 are hollow ground. The blade is otherwise as is shown in Fig. 1, being provided with the fork tines 15′ and 16′.

In Fig. 4 there is shown a carving knife blade having saw teeth 32 formed on its upper longitudinal edge, and comprising a group of teeth 33 set to the right, and a group of teeth 34 set to the left, these two groups are arranged in alternate positions. A fork having tines 15″ is formed on the end.

Each end fork is constructed with a basic functional plan. The upper tine 15 is formed with a bevelled terminal or tip 15c, and the lower tine 16 is formed with a bevelled terminal or tip 16c. In this way the extreme piercing end portions of the two tines are disposed outwardly of the inner and parallel edges of the tines, so that when the fork is forced through a slice or body of meat, that portion of the meat which enters the longitudinal slot of the fork will be compressed somewhat, instead of being stretched, and will, thereby, establish a better wedging action between and against inner parallel edges of the fork tines.

The carving knife blade being of stainless steel of the highest quality, will resist corrosion from meat, and the hand, and will maintain a smooth highly polished surface which will aid easy meat slicing. When the cut is through a leg or other part of a carcass having a bone, the knife blade is reversed so that the cutting teeth of the saw edge can be worked against the bone, and due to the special construction of these saw teeth rapid cutting of the bone may be accomplished. When the knife blade is withdrawn rearwardly for bone sawing the stop 15b aids in preventing the complete withdrawal of the blade, so that continuous sawing may be done.

The handle is constructed of high quality wood impregnated with plastic and compressed to provide a body of maximum resistance to disintegration and of great strength and high smoothness.

In Fig. 9 there is shown a modified form of the tooth construction, wherein the sides of the blade tooth are made parallel to each other and the tooth carrying upper longitudinal edge is formed with a relatively sharp V-shape to provide the teeth 19a, wider than the thickness of the blade itself, to avoid the need for setting of the teeth.

In Fig. 9A there is shown a modified form of the blade, which is shown to be triangular in cross section, to provide a thicker longitudinal upper edge 19b, on which the teeth 19c are formed.

In Fig. 10 there is shown a blade 35, having a hollow ground cutting edge 36 which extends forwardly in an end curve 37, so that end cutting may be carried on. The back edge of the blade is formed with a thickened rib 38 having the bone cutting teeth 39 formed thereon.

It is understood that the blade may be made from any type of cutting steel or metal, such as high carbon steel, carbon, chromium and nickel steel, vanadium steel, tungsten steel, or any type of alloy steel or metal.

The improved knife with bone cutting teeth may be used also for cutting frozen food, which is extremely hard to saw and otherwise cut.

While various changes may be made in the details of construction, it shall be understood that such changes shall be within the spirit and scope of the present invention as defined in the appended claims.

Having described the invention I claim as new:

1. In a knife having a cutting edge extending along one side thereof, a sawtoothed edge extending along the opposite side thereof and a handle portion, the combination therewith of a fork formation comprising tines projecting from the knife body and separated by an elongated slot terminating in the knife body and having parallel opposing edges, with the ends thereof diverging outwardly adjacent the points of the tines to provide a wedging action as the fork formation is thrust into a piece of meat and the meat extended along the side edges of the slot, the cutting edge of the knife blade extending along one of said tines to the pointed end thereof, a cutting edge provided on the other of said tines from its pointed end with a stop projection adjacent the sawtoothed edge to resist the extension of meat onto the sawtoothed edge when the fork formation is thrust thereinto.

2. In a knife having a cutting edge extending along one side thereof, a sawtoothed edge extending along the opposite side thereof and a handle portion, the combination therewith of a fork formation comprising tines projecting from the knife body at equal length and separated by an elongated slot terminating in the knife body and having parallel opposing edges, with the ends thereof diverging outwardly at the points of the tines to provide a wedging action as the fork formation is thrust into a piece of meat and the meat extended along the side edges of the slot, the cutting edge of the knife blade extending along one of said tines to the pointed end thereof, and a stop projection adjacent the saw tooth edge to resist the extension of meat onto the saw toothed edge when the fork formation is thrust thereinto.

(References on following page)

References Cited in the file of this patent

UNITED STATES PATENTS

| Number | Name | Date |
|---|---|---|
| D. 42,622 | Gafinowitz | June 18, 1912 |
| D. 140,397 | Waterman | Feb. 20, 1945 |
| D. 152,727 | Peterson | Feb. 15, 1949 |
| D. 154,482 | Hill | July 12, 1949 |
| 700,617 | Cobaugh | May 20, 1902 |
| 1,051,454 | Rouse | Jan. 28, 1913 |
| 1,171,241 | Potter | Feb. 8, 1916 |
| 1,254,591 | Hackmann | Jan. 22, 1918 |
| 1,388,547 | Barnes | Aug. 23, 1921 |
| 1,935,149 | Elvin | Nov. 14, 1933 |
| 1,993,170 | Havener | Mar. 5, 1935 |
| 2,126,080 | Backer | Aug. 9, 1938 |
| 2,293,286 | Fenner | Aug. 18, 1942 |
| 2,305,476 | Johnson | Dec. 15, 1942 |
| 2,555,735 | Estabrooks | June 5, 1951 |